United States Patent
Strogov et al.

(10) Patent No.: US 12,530,449 B2
(45) Date of Patent: Jan. 20, 2026

(54) SYSTEM AND METHOD FOR THREAT DETECTION BASED ON STACK TRACE AND KERNEL SENSORS

(71) Applicant: Acronis International GmbH, Schaffhausen (CH)

(72) Inventors: Vladimir Strogov, Singapore (SG); Sergey Ulasen, Singapore (SG); Aliaksei Dodz, Singapore (SG); Serg Bell, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 312 days.

(21) Appl. No.: 18/148,965

(22) Filed: Dec. 30, 2022

(65) Prior Publication Data

US 2024/0220614 A1 Jul. 4, 2024

(51) Int. Cl.
G06F 21/55 (2013.01)

(52) U.S. Cl.
CPC ...... *G06F 21/554* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 10,673,880 B1 * | 6/2020 | Pratt | ............... | H04L 63/1425 |
| 11,216,555 B2 * | 1/2022 | Monastyrsky | ...... | H04L 63/1408 |
| 11,416,612 B2 | 8/2022 | Strogov et al. | | |
| 11,494,491 B2 | 11/2022 | Strogov et al. | | |
| 2013/0111462 A1 * | 5/2013 | Umansky | ............. | G06F 21/554 |
| | | | | 717/174 |
| 2016/0232347 A1 * | 8/2016 | Badishi | ................. | G06F 21/54 |
| 2018/0032905 A1 * | 2/2018 | Abercrombie | ...... | G06F 11/3006 |

OTHER PUBLICATIONS

Sushentsev et al., "DAPSTEP: Deep Assignee Prediction for Stack Trace Error rePresentation". Jan. 14, 2022 (Year: 2022).*

* cited by examiner

*Primary Examiner* — Scott B Christensen
(74) *Attorney, Agent, or Firm* — ESPE Legal Consultancy FZ-LLC

(57) ABSTRACT

A method and system for threat detection and analysis is disclosed herein. The method includes monitoring at least one thread associated with at least one process on a computing system. The method further includes detecting specific system calls associated with at least one process at kernel level. The specific system calls are analyzed by applying a filter to the system calls sequence feature set associated with the specific system calls for detecting one or more events of interest. A full stack trace capture of at least one process is requested if the system calls sequence feature set is filtered and the one or more events of interest are detected. A first level monitoring is provided to the computing system, which includes processing and analyzing the captured full stack trace by a machine learning (ML) stack trace analyzer to generate a first verdict for threat detection and analysis.

20 Claims, 2 Drawing Sheets

SYSTEM AND METHOD FOR THREAT DETECTION BASED ON STACK TRACE AND KERNEL SENSORS

FIELD OF THE INVENTION

The present disclosure generally relates to the field of threat detection. In particular, the present disclosure relates to methods and systems for threat detection and analysis for threats that use process injection.

BACKGROUND OF THE INVENTION

Malware is a malicious software that is designed to corrupt specific software codes in a computer system for the purpose of infiltrating or damaging the computer system. As such, malware can cause abnormal operation of the computer system or even termination of some applications and the operating system. Typically, malware can be detected in the computer system by analyzing the processes running on thereon, where the suspicious processes can be detected and blocked by security systems installed on the computer system.

Collecting system events and stack traces are used for malware detection. However, a disadvantageous aspect of the typical methods is that the stack traces are collected independently from the set of hooked system events and are not synchronized. Thus, the process of analyzing the collected system events and stack traces requires correlation of system events with the captured stack traces, which puts a burden on operational resources. Furthermore, with typical methods there can be a scenario where the post analysis of the operations may require missing information (for example a stack trace) because the process state was irreversibly changed.

Therefore, there is a need for improved systems and methods of collecting and analyzing system events and stack traces in a manner that has a very low impact on the resource utilization of the computing system whose system events and stack traces are being analyzed.

SUMMARY OF THE INVENTION

The present disclosure envisages a method for threat detection and analysis. The method comprises monitoring at least one thread of a first process on a computing system. Specific system calls are detected corresponding to the first process at kernel level. The specific system calls are analyzed by applying a filter to the system calls sequence feature set associated with the specific system calls for detecting one or more events of interest. A full stack trace capture of the first process is requested if the system calls sequence feature set is filtered, and the one or more events of interest are detected. A first level monitoring to the computing system is provided, which includes processing and analyzing the captured full stack trace by a machine learning (ML) stack trace analyzer to generate a first verdict for threat detection and analysis.

In an embodiment, the method further includes capturing a call stack trace at kernel level associated with the first process.

In an embodiment, the method further includes providing a second level monitoring to the computing system, which includes providing the first verdict and the captured call stack to an aggregated ML analyzer to generate a second verdict for threat detection and analysis.

In an embodiment, the method further comprises monitoring at least one thread of the second process on a computing system. Specific system calls corresponding to the second process are detected at kernel level. The detected system calls of the first and the second processes are then associated.

In an embodiment, the first process is a target process, and the second process is a source process In an embodiment, the method further includes determining the source process based on associated system calls in response to the generated verdict.

In an embodiment, the method further includes analyzing the source process with static and dynamic analyzers for threat detection.

In an embodiment, the requesting the full stack trace capture is performed by the file protection driver.

In an embodiment, the method further includes preprocessing the full stack trace by filtering whitelist calls from the full stack trace, and deduplicating calls.

The present disclosure further envisages a system for threat detection and analysis. The system includes a kernel sensor configured to monitor at least one thread of a first process on a computing system. The kernel sensor is further configured to detect specific system calls corresponding to the first process at kernel level. The kernel sensor is further configured to analyze the specific system calls by applying a filter to the system calls sequence feature set associated with the specific system calls for detecting one or more events of interest. The kernel sensor then requests a full stack trace capture of the first process if the system calls sequence feature set is filtered and one or more events of interest are detected. A file protection driver is configured to capture requested full stack traces. A machine learning (ML) stack trace analyzer configured to provide a first level monitoring to the computing system, which includes processing and analyzing the captured full stack trace and generating a first verdict for threat detection and analysis.

In an embodiment, the kernel sensor is further configured to capture a call stack trace associated with the first process at the kernel level.

In an embodiment, the system further includes an aggregated ML analyzer configured to provide a second level monitoring to the computing system, which includes providing the first verdict and the captured call stack trace to the aggregated ML analyzer and generating a second verdict for threat detection and analysis.

In an embodiment, the kernel sensor is further configured to monitor at least one thread of a second process on a computing system and detect specific system calls corresponding to the second process at kernel level. The kernel sensor is further configured to associate detected system calls of the first and the second processes.

In an embodiment, the first process is a target process, and the second process is a source process.

In an embodiment, the system is configured for determining the source process based on associated system calls in response to the generated verdict.

In an embodiment, the system further includes static and dynamic analyzers, configured to analyze the source process.

DETAILED DESCRIPTION

Malware detection in a computer system is typically performed by collecting system events and stack traces. A disadvantageous aspect, however, of the typical methods is that the stack traces are collected independently from the set of hooked system events and are not synchronized. The lack of synchronization means that the computing system is required to deploy system resources first to achieve a synchrony between the hooked system events and the stack traces. Such synchrony can be achieved by the process of analyzing the collected system events and stack traces, which requires filtering of system events and correlation with the captured stack traces. As mentioned previously, these are very resource intensive operations, which may cause the computing system to operate inefficiently. This is not desired.

To this end, the present disclosure envisages a system and method for threat detection and analysis that is designed to analyze system calls and stack traces in a manner that is not resource intensive, thereby contributing to an efficient utilization of system resources and consequently to the efficient operation of the computing system while providing the feature of threat detection and also the analysis of the detected threat.

In accordance with the present disclosure, the system and method are designed to provide two different monitoring levels to the computing system, thereby allowing a thorough analysis of the system events for the purpose of threat detection and analysis. Furthermore, the present disclosure includes the usage of machine learning models for the purpose of providing the two different levels of monitoring to the computing system, which serves to increase the efficiency as well as accuracy of the process of monitoring to provide a final verdict of threat detection and analysis with reasonable certainty.

Figure 1:
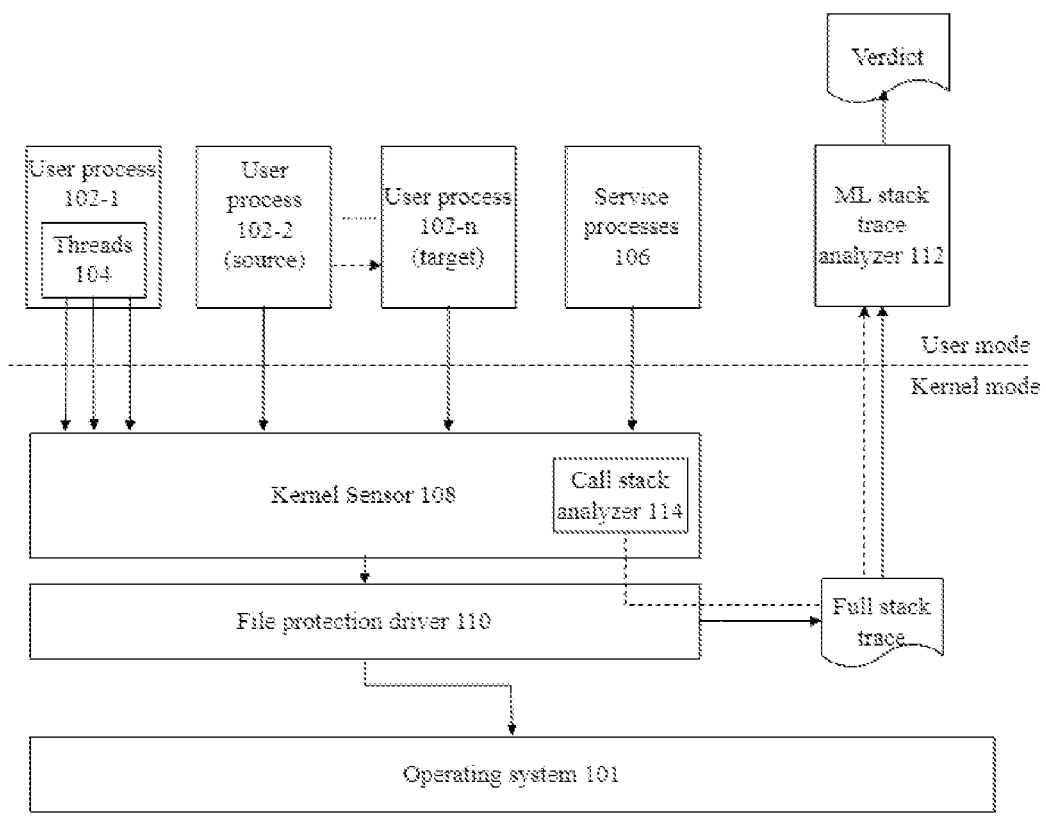
FIG. 1 shows a block diagram of a system for threat detection and analysis, in accordance with an embodiment of the present disclosure.

FIG. 1 shows a block diagram of a system for threat detection and analysis, in accordance with an embodiment of the present disclosure. The computing system operates in a kernel mode and a user mode. The system 100, in accordance with an embodiment of the present disclosure, is designed to provide monitoring of system events in kernel mode for the purpose of threat detection and analysis. The system 100 includes user processes 102-1, . . . , 102-n running on a computing system having an operating system 101, in accordance with the present disclosure. Each user process 102-1, . . . , 102-n can include multiple threads 104. The system 100 also includes service processes 106 running on the computing system. In accordance with an embodiment of the present disclosure, the system 100 is designed to monitor threads 104 of the user processes 102-1, . . . , 102-n and the service processes 106. In an embodiment, the monitoring of the user processes 102-1, . . . , 102-n and the service processes 106 is facilitated by a kernel sensor 108 operating in kernel mode. In accordance with one embodiment, the kernel sensor 108 can be a special driver configured to monitor specific system calls associated with the user processes 102-1, . . . , 102-n and the service processes 106.

Modern malware often uses code injection techniques, exploitation of vulnerabilities or other malicious functions based on inter-process communication. In one of the implementations, process 102-2 is the source of infection for target process 102-n. For example, process 102-2 injects malicious code or a library into process 102-n. This operation can be performed as a chain of interprocess interactions, including using services 106. There are examples of threats when, using vulnerabilities in a driver or another module of the operating system 101, malicious code is executed on behalf of a service process 106, in which case the service can also be a source of infection in this context. To address such a threat, the kernel sensor is capable to associate hooked or intercepted system calls from different processes and determine the possible source process 102-2 based on the verdict of threat detection in the target process 102-n.

The system 100 further comprises a file protection driver 110. The file protection driver 110, in accordance with the present disclosure, is communicatively coupled to the kernel sensor 108. The kernel sensor 108 is configured to detect the specific system calls associated with the user processes 102-1, . . . , 102-n and the service process 106, which are then analyzed for the purpose of detecting events of interest. The analysis of system calls in the kernel sensor is performed at call stack analyzer 114. More specifically, the user processes 102-1, . . . , 102-n and the service process 106 are analyzed at the call stack analyzer by applying a filter to system calls sequence feature set associated therewith for detecting the events of interest. In accordance with the present disclosure, events of interest can include any events that indicate abnormal operation of processes being analyzed, which can be indicative of a malware presence on the computing system.

In accordance with the present disclosure, on positive detection of an event of interest, the file protection driver 110 is configured to request a full stack trace capture of the user processes 102-1, . . . , 102-n or the service processes 106 corresponding to the events of interest. In one embodiment, the file protection driver captures the full stack trace of the target user process 102-n if this process makes a suspicious call or a series of calls that are determined by the kernel sensor 106 as suspicious.

The file protection driver is also configured to preprocess the captured full stack trace by deduplication of calls, filtering whitelist calls and modules, like libraries, to produce the convolution of full stack trace for more efficient further analysis.

One example of a malware or the event of interest is ransomware shell code injection with CreateRemoteThread. In one implementation of the malware, the malware opens a target process using OpenProcess. The malware then performs memory allocation using VirtualAllocEx. It writes a malicious code into the target process using WriteProcessMemory, and finally calls CreateRemoteThread to execute the injected malicious code. Therefore, for this example, the specific system calls associated with the target process monitored at the kernel level using the kernel sensor 108 include PROCESS_CREATE_THREAD, PROCESS_SUSPEND_RESUME, PROCESS_VM_OPERATION, PROCESS_VM_WRITE, and so on.

Another example of malware or the event of interest is shell code injection using QueueUserApc (APC—Asynchronous Procedure Call). In one implementation of the malware, the malware opens a target process using OpenProcess. It performs a memory allocation using VirtualAllocEx. It writes malicious code into the target process using WriteProcessMemory. It calls OpenThread to get access to already running threads of the process. The malware finally uses QueueUserApc to inject APC code, which is actually the malicious injected code in the target process. Therefore, for this example, the specific system calls associated with the target process monitored at the kernel level using the kernel sensor 108 include PROCESS_CREATE_THREAD, PROCESS_SUSPEND_RESUME, PROCESS_VM_OPERATION, PROCESS_VM_WRITE, and so on.

In accordance with the present disclosure, the captured full stack trace or convolution of full stack trace is analyzed further for the purpose of providing a second level monitoring of the computing system. The system 100 further includes a Machine Learning (ML) stack trace analyzer 112. The ML stack trace analyzer 112 is configured to analyze the captured full stack trace or convolution of full stack trace and generate a verdict for threat detection and analysis. In another embodiment, the ML stack trace analyzer is configured to analyze the captured full stack trace or convolution of full stack trace with addition of intercepted system calls, which lead to full stack trace capturing. In yet another embodiment, the ML stack trace analyzer is configured to analyze the captured full stack trace or convolution of full stack trace with addition of events of interest, which lead to full stack trace capturing.

In yet another embodiment, the file protection driver 110 is configured to request capture of a call stack trace, by the kernel sensor 108, of the user processes 102-1, . . . , 102-$n$ and the service processes 106. The first verdict generated by the ML stack trace analyzer 112 and the captured call stack trace of the user processes 102-1, . . . , 102-$n$ and the service processes 106 is provided to a Machine Learning (ML) aggregated analyzer 114 for the purpose of analysis to generate a second verdict for threat detection and analysis.

Therefore, the present disclosure includes the use of different machine learning models for the purpose of threat detection and analysis. These models are trained respectfully on full stack traces, convolution of full stack traces, combination of stack traces of different processes, combination of full stack traces and events of interest.

In one embodiment, the second verdict can be the final verdict of threat detection and analysis.

One exemplary implementation of the system 100 is hereinafter described with reference to FIG. 1. The system 100 includes a first user process 102-1 of the plurality of user processes 102-1, . . . , 102-$n$. The kernel sensor 108 is configured to monitor the thread 104 of the first user process 102-1. The file protection driver 110 of the system 100 is configured to detect the specific system calls associated with the first process 102-1, which are then analyzed for detection of events of interest. As mentioned previously, the events of interest can be an indicative of malware presence in the computing system.

On positive detection of the event of interest, the file protection driver is configured to request a full stack trace capture of the first user process 102-1, which is then provided to the ML stack trace analyzer 112. As mentioned previously, the ML stack trace analyzer 112 is the machine learning model configured to provide the first level monitoring to the computing system, which includes processing and analyzing the captured full stack trace to generate the first verdict for threat detection and analysis.

In accordance with the present implementation, consider the second user process 102-2. In accordance with the implementation, the second user process 102-2 is monitored as well by the kernel sensor 108. The file protection driver 110 of the system 100 is configured to detect the specific system calls associated with the second user process 102-2, which are then analyzed for detection of events of interest. As mentioned previously, the events of interest can be an indicative of malware presence in the computing system.

Additionally, a relation of processes, threads, and files corresponding to detected system calls associated with processes 102-1, 102-2 and 102-$n$ are also identified by the file protection driver 110, in accordance with the present implementation. Now the first level monitoring includes processing and analyzing by the ML stack trace analyzer 112 the associated system calls with additional attributes corresponding to the identified relation between the first and the second processes 102-1, 102-2 of the at least one process to generate the first verdict for the first and the second processes 102-1, 102-2.

The verdict generated by the ML stack trace analyzer 112 with respect to the first and the second processes 102-1, 102-2, 102-$n$ can then be provided to the ML aggregated analyzer along with the call stacks of the monitored processes 102-1, 102-2, 102-$n$ captured by the kernel sensor 108 to provide the second level monitoring to the computing system. The ML aggregated analyzer 114 then generates a second verdict of threat detection in accordance with the first verdict and the call stack of the processes 102-1, 102-2, 102-$n$.

Similarly, the implementation can include monitoring another process and generating the final verdict for threat detection and analysis based on analysis of specific system calls, corresponding full stack traces, call stack traces, and additional attributes associated with relation between the first, second, and third processes, and so on for a plurality of processes.

An advantageous aspect of the system 100, in accordance with the present disclosure, is that the system 100 facilitates the capture of full stack traces of only those processes that exhibit suspicious behavior. As such, the disadvantageous aspect of the typical methods of malware detection where stack traces are collected independently from the set of hooked system events with any synchrony therebetween is eliminated by the system 100 of the present disclosure. Therefore, the computing system does not have to expend any additional resource in filtering of system events and correlation with the captured stack traces.

Another advantageous aspect of the system 100 is that the usage of the two machine learning models, namely, the ML stack trace analyzer 112 and the aggregated analyzer provides two different levels of monitoring to the computing system, thereby improving on the accuracy of threat detection and analysis relative to the known systems.

ML models, in particular embodiments, can be built on neural networks, deep learning algorithms, and other models that allow classifying a set of input data, consisting of a full stack trace, convolution of full stack, system calls, events, a first-level verdict, or combinations of these data. The verdict of ML models comprises at least one of a probabilistic value characterizing the relation of input data to one or more classes of malware, part of the call stack characterizing the involvement of input data in one or more classes of malware, calls characterizing the involvement of input data in one or more classes of malware.

In one embodiment, if the target process is classified as malicious based on the first or the second verdict, then the source process that initiated an injection to the target process is analyzed for malicious code. The analysis of the source process is performed using at least one of static and dynamic malware analysis.

In another embodiment, if the target or source processes are classified as malicious, the response action is performed. Response action comprises at least one of terminating the process, freezing the process, killing the process, quarantining the process, determining the file associated with the source process and deleting this file, determining the network connections associated with the target or source processes and blocking these connections.

Figure 2:
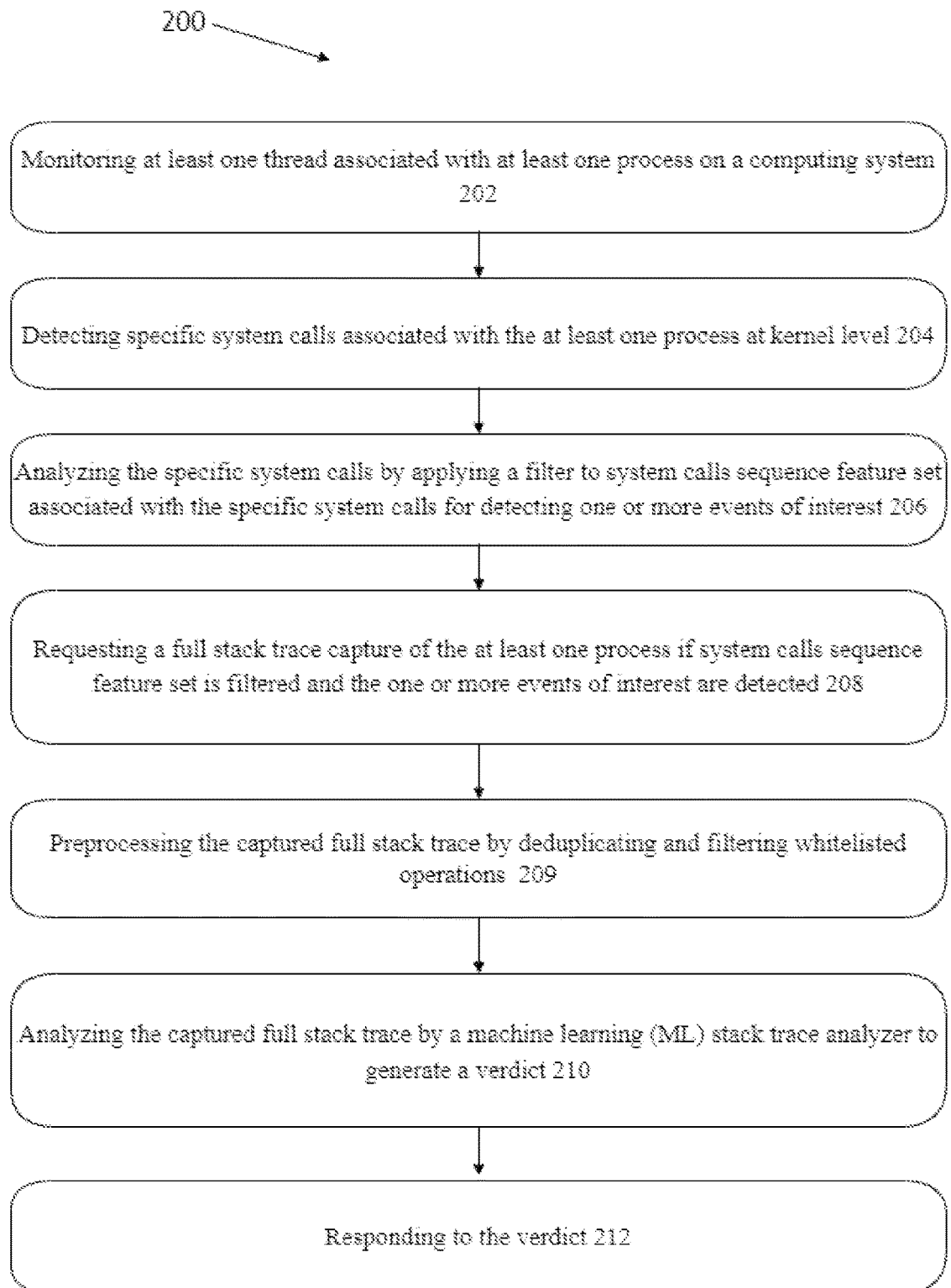
FIG. 2 shows a block diagram of a method for threat detection and analysis, in accordance with another embodiment of the present disclosure.

FIG. 2 shows a block diagram of a method for threat detection and analysis 200 (hereinafter referred to as method 200), in accordance with another embodiment of the present disclosure. The order in which the method 200 is described is not intended to be construed as a limitation, and any number of the described method blocks can be combined in any order to implement the method or similar alternative methods. Additionally, individual blocks can be deleted from the method without departing from the scope of the subject matter described herein. Furthermore, the method can be implemented in any suitable hardware, software, firmware, or combination thereof.

At block 202, the method 200 includes monitoring at least one thread associated with at least one process on a computing system. In an embodiment, the computing system can include one or more user processes and one or more service processes. In an embodiment, such monitoring is performed by the kernel sensor 108. The kernel sensor 108 operates at the kernel level of the computing system.

At block 204, the method 200 includes detecting specific system calls associated with at least one process at kernel level. In an embodiment, the kernel sensor 110 is configured to detect the specific system calls. In particular embodiment, the kernel sensor 110 detects at step 204 specific system calls of the target process. In particular, the kernel sensor 110 detects at step 204 specific system calls of the source process. The step 204 further comprises associating by kernel sensor hooked or intercepted system calls from different processes, association of the calls is further used to determine the possible source process based on the verdict of threat detection in the target process, wherein target and source processes are monitored by kernel sensor.

At block 206, the method 200 includes analyzing the specific system calls by applying a filter to the system calls sequence feature set associated with the specific system calls for detecting one or more events of interest. In an embodiment, the detection of the one or more events of interest at the kernel mode is facilitated by the file protection driver 110. As mentioned previously, the event of interest can be any event that indicates abnormal operation thereof, which is indicative of malware presence in the computing system.

At block 208, the method 200 includes requesting a full stack trace capture of at least one process if the system calls sequence feature set is filtered and the one or more events of interest are detected. In an embodiment, the file protection driver 110 is configured to request the full stack trace capture by the kernel sensor 108. In one particular embodiment, the method comprises capturing the full stack trace of the target process.

At step 209, captured full stack trace is preprocessed. Preprocessing comprises deduplication of calls, filtering whitelist calls and modules, like libraries, to produce the convolution of full stack trace for more efficient further analysis.

At block 210, the method 200 includes providing a first level monitoring to the computing system, which includes processing and analyzing the captured full stack trace by a machine learning (ML) stack trace analyzer to generate a first verdict for threat detection and analysis.

At block 212, the response action to the verdict is performed. In one embodiment, if the target process is classified as malicious based on the first verdict, then the source process that initiated an injection to the target process is analyzed for malicious code. The analysis of the source process is performed using at least one of static and dynamic malware analysis. In another embodiment, if the target or source processes are classified as malicious, the response action is performed. Response action comprises at least one of terminating the process, freezing the process, killing the process, quarantining the process, determining the file associated with the source process and deleting this file, determining the network connections associated with the target or source processes and blocking these connections. If the verdict does not allow to determine the harmfulness of the process with a certain accuracy, then the second level of monitoring is applied using the ML aggregated model. The verdict generated by the ML stack trace analyzer 112 can then be provided to the ML aggregated analyzer 114 along with the call stacks of the monitored processes detected by the kernel sensor 108 to provide the second level monitoring to the computing system and to generate a second verdict for threat detection and analysis.

In one implementation, method 200 includes monitoring at least one thread associated with a first process of at least one process. At least one process can be either a user process or a service process.

In accordance with the implementation, the method 200 further includes monitoring at least one thread associated with a process. The method further includes detecting specific system calls associated with the first process and the second process. The detected specific system calls associated with the first and the second processes are analyzed for detecting the one or more events of interest. The method further includes identifying relations of processes, threads, and files corresponding to detected system calls associated with the first and the second processes of at least one process. The method further includes providing the first level monitoring to the computing system, which includes processing and analyzing by the ML stack trace analyzer the associated system calls with additional attributes corresponding to the identified relation between the first and the second processes of the at least one process.

Similarly, the implementation can include monitoring a third process and generating the final verdict for threat detection and analysis based on analysis of specific system calls, corresponding full stack traces, call stack traces, and additional attributes associated with relation between the first, second, and third processes, and so on for a plurality of processes.

In an embodiment, the second verdict provided by the ML aggregated analyzer 114 can be the final verdict for threat detection and analysis. An advantageous aspect of method 200, in accordance with the present disclosure, is that method 200 facilitates the capture of full stack traces of only those processes that exhibit suspicious behavior. As such, the disadvantageous aspect of the typical methods of malware detection where stack traces are collected independently from the set of hooked system events with any synchrony therebetween is eliminated by the method 200 of the present disclosure. Therefore, the computing system does not have to expend any additional resource in filtering of system events and correlation with the captured stack traces.

Another advantageous aspect of the method 200 is that the usage of the two machine learning models, namely, the ML stack trace analyzer 112 and the call stack analyzer 114 provides two different levels of monitoring to the computing system, thereby improving on the accuracy of threat detection and analysis relative to the known methods.

The invention claimed is:
1. A method for threat detection and analysis in a computer system with a kernel level, the method comprising:

training a machine learning (ML) stack trace analyzer on pairs of historical stack traces and system calls to output a threat prediction for an input convolution of a stack trace;
monitoring threads of a first process on the computing system;
detecting specific system calls corresponding to the first process at the kernel level;
analyzing the specific system calls by applying a filter to a system-calls sequence feature set associated with the specific system calls for detecting a sequence of events of interest, the events of interest comprising a plurality of specific system calls;
requesting a full stack trace capture of the first process when the sequence of events of interest is detected;
providing a first level monitoring to the computing system, wherein the first level monitoring comprises processing the captured full stack trace to create a convolution of the full stack trace and analyzing the convolution of the captured full stack trace by the ML stack trace analyzer to output a threat prediction;
generating a probabilistic first verdict based on the threat prediction for threat detection and analysis; and
taking a response action in accordance with the first verdict.

2. The method of claim 1, wherein the response action comprises at least one of terminating the process, freezing the process, killing the process, quarantining the process, determining the file associated with the source process and deleting the file, or determining the network connections associated with the target or source processes and blocking the connections.

3. The method of claim 1, further comprising capturing a call stack trace at kernel level associated with the at least one process.

4. The method of claim 1, further comprising providing a second level monitoring to the computing system, wherein the second level monitoring includes providing the first verdict and the captured call stack to an aggregated ML analyzer to generate a second verdict for threat detection and analysis.

5. The method of claim 1, further comprising the steps of:
monitoring threads of a second process on a computing system;
detecting a sequence of specific system calls corresponding to the second process at kernel level; and
associating the detected system calls of the first and the second processes.

6. The method of claim 5, wherein the first process is a target process, and the second process is a source process.

7. The method of claim 6, further comprising determining the source process based on associated system calls in response to the generated verdict.

8. The method of claim 7, further comprising analyzing the source process with static and dynamic analyzers for threat detection.

9. The method of claim 1, wherein the requesting the full stack trace capture is performed by a file protection driver.

10. The method of claim 3, further comprising preprocessing the full stack trace by:
filtering whitelist calls from the full stack trace; and
deduplicating calls.

11. The method of claim 1, wherein a stack trace is not collected independently from a detected sequence of events of interest.

12. The method of claim 11, wherein the detected sequence of events of interest comprises a sequence of at least four system calls.

13. A system for threat detection and analysis, the system comprising:
a processor coupled to memory and nonvolatile storage, the processor running an operating system comprising user space and kernel space, the kernel space comprising a kernel sensor configured to:
monitor threads of a first process on a computing system;
detect specific system calls corresponding to the first process at kernel level;
analyze the specific system calls by applying a filter to system-calls sequence feature set associated with the specific system calls for detecting a sequence of events of interest, the events of interest comprising a plurality of specific system calls; and
request a full stack trace capture of the first process when the sequence of events of interest is detected;
a file protection driver, configured to capture requested full stack trace; and
a machine learning (ML) stack trace analyzer configured to provide a first level monitoring to the computing system, wherein the ML stack trace analyzer has been trained on pairs of historical stack traces and system calls to output a threat prediction for an input convolution of a stack trace, and wherein the first level monitoring includes processing the captured full stack trace to create a convolution of the full stack trace and analyzing the convolution of the captured full stack trace to output a threat prediction and generating a probabilistic first verdict based on the threat prediction for threat detection and analysis.

14. The system of claim 13, wherein the kernel sensor is further configured to capture a call stack trace associated with at least one process at the kernel level.

15. The system of claim 13, further comprising an aggregated ML analyzer configured to provide a second level monitoring to the computing system, wherein the second level monitoring includes providing the first verdict and the captured call stack trace to the call stack ML analyzer and generating a second verdict for threat detection and analysis.

16. The system of claim 13, wherein the kernel sensor is further configured to:
monitor threads of the second process on a computing system;
detect a sequence of specific system calls corresponding to the second process at kernel level; and
associate detected system calls of the first and the second processes.

17. The system of claim 16, wherein the first process is a target process, and the second process is a source process.

18. The system of claim 17, further comprising determining the source process based on associated system calls in response to the generated verdict.

19. The system of claim 18, further comprising static and dynamic analyzers, configured to analyze the source process.

20. The system of claim 13, wherein the file protection driver is not configured to collect stack traces independently from the detected sequence of events of interest.

* * * * *